Dec. 19, 1950     W. N. FENNEY     2,534,346
INTERNAL-COMBUSTION ENGINE

Filed Dec. 23, 1943     3 Sheets-Sheet 1

INVENTOR.
WILLIAM N. FENNEY
BY
ATTORNEY

Dec. 19, 1950  W. N. FENNEY  2,534,346
INTERNAL-COMBUSTION ENGINE
Filed Dec. 23, 1943  3 Sheets-Sheet 3

INVENTOR.
WILLIAM N. FENNEY
BY
ATTORNEY

Patented Dec. 19, 1950

2,534,346

UNITED STATES PATENT OFFICE 2,534,346

INTERNAL-COMBUSTION ENGINE

William N. Fenney, New York, N. Y., assignor, by mesne assignments, to The Texas Company, New York, N. Y., a corporation of Delaware Application December 23, 1943, Serial No. 515,354

8 Claims. (Cl. 123—32)

This invention relates to an internal combustion engine and to a method of operating such an engine.

More particularly, this invention relates to engines of the type disclosed and claimed in the copending application of Everett M. Barber, Serial No. 10,598 filed February 25, 1948 (now Patent 2,484,009 issued October 11, 1949) as a continuation-in-part of Serial No. 513,232, filed December 7, 1943, now abandoned, wherein air is introduced into the combustion space of the engine and compressed therein, fuel is injected into the compressed air, generally toward the latter part of the compression stroke, the first increment of injected fuel is spark-ignited substantially as soon as combustible fuel vapor-air mixture is formed therefrom to establish a traveling flame front, and the fuel injection is continued while the compressed air and the locus of fuel injection are moved relatively to each other in an orderly manner to progressively form additional quantities of the combustible mixture immediately in advance of the traveling flame front to be ignited thereby and burned substantially as rapidly as formed. The said application discloses that the air introduced into the cylinder for compression may also be carbureted so long as the resulting carbureted mixture is so lean as to be below the combustible limit. The present invention relates to an improvement on this latter type of engine and method of operating such an engine and involves coordinated control of the proportions of total fuel added by the carbureted mixture and by injection on each cycle in accordance with the engine load, as well as provisions for automatically terminating fuel injection and richening the carbureted mixture to render the latter combustible for idling, and other features of novelty, as hereinafter described.

Where all the fuel for this so-called "no-knock" combustion is introduced by fuel injection, an appreciable time interval may be required to form combustible mixture with the compressed air, involving the problem of distribution of the injected fuel throughout the necessary volume of the air in the combustion space to produce the power required. While efficient operation is secured and unusually high power with freedom from knock can be obtained, some difficulties may be encountered at certain loads or at high speeds wherein imperfect combustion takes place with loss in efficiency or increased specific fuel consumption and with resulting smoke and odor of the exhaust gases. Also, difficulties may be encountered in securing proper idling of the engine.

These objections or difficulties are overcome by introducing the fuel into the combustion space by both carbureted mixture which is too lean to support combustion and by coordinated fuel injection during normal operation of the engine under load. In accordance with the present invention, the combined carburetion and fuel injection are coordinated and proportioned by a single control which is preferably the throttle control. The proportion of fuel supplied by carbureted mixture, and the proportion of fuel supplied by injection on each cycle is controlled in accordance with engine load whereby the proportion of carbureted fuel to injected fuel increases at decreasing engine load and vice versa. This enables the carbureted fuel-air mixture to be maintained below the combustible limit throughout the normal load range of engine operation, and the power delivered by the engine to be controlled by the amount of additional fuel injected in atomized form on each cycle. Moreover, by throttling the air at the lower loads, increased efficiency is obtained due to the minimizing of pumping losses. Also, since the proportion of hot exhaust gases remaining in the combustion space on each cycle is increased by the throttling, improved combustion efficiency is secured with a reduction in misfiring and consequent reduction in exhaust gas smoke and odor.

Preferably in accordance with the present invention, the fuel is first injected in the form of a cone-shaped jet of lower intensity, the first entering portion of this fuel being promptly ignited as soon as combustible mixture is formed therefrom. Injection is then continued by both the cone jet and a center jet of higher intensity, which latter is directed across a chord of the combustion space in a manner to impinge on the hot exhaust valve and further aid in the atomization of the injected fuel and the prompt formation of the envelopes of combustible fuel-air mixture in the immediate region of the flaming envelopes of previously ignited fuel particles.

Further, in accordance with the present invention, the injection of atomized fuel is automatically terminated upon idling of the engine and at the same time the carbureted fuel-air mixture drawn into the combustion space on each cycle is automatically richened to render the same combustible, such that this charge can be fired by spark ignition in the manner of conventional Otto cycle operation. Due to the lower temperature, pressure and charge density of idling operation, the problem of knock is not present, whereas the problem of fuel distribution becomes acute. This invention therefore enables the more perfect fuel distribution obtained by carburetion to be utilized for idling, while the normal "no-knock" operation involving the use of both the lean carbureted mixture and the fuel injection is immediately resumed without any additional manual control other than opening of the conventional throttle. Preferably the spark is automatically retarded for this idling operation on carbureted mixture, and is automatically advanced to coincide with about the beginning of fuel injection upon resumption of normal operation under load.

The invention is illustrated in the attached drawing which discloses a preferred embodiment thereof, and wherein Fig. 1 is a partial vertical sectional view through an engine cylinder of the present invention, showing appurtenances including the intake manifold and fuel injection nozzle;

Figure 1:
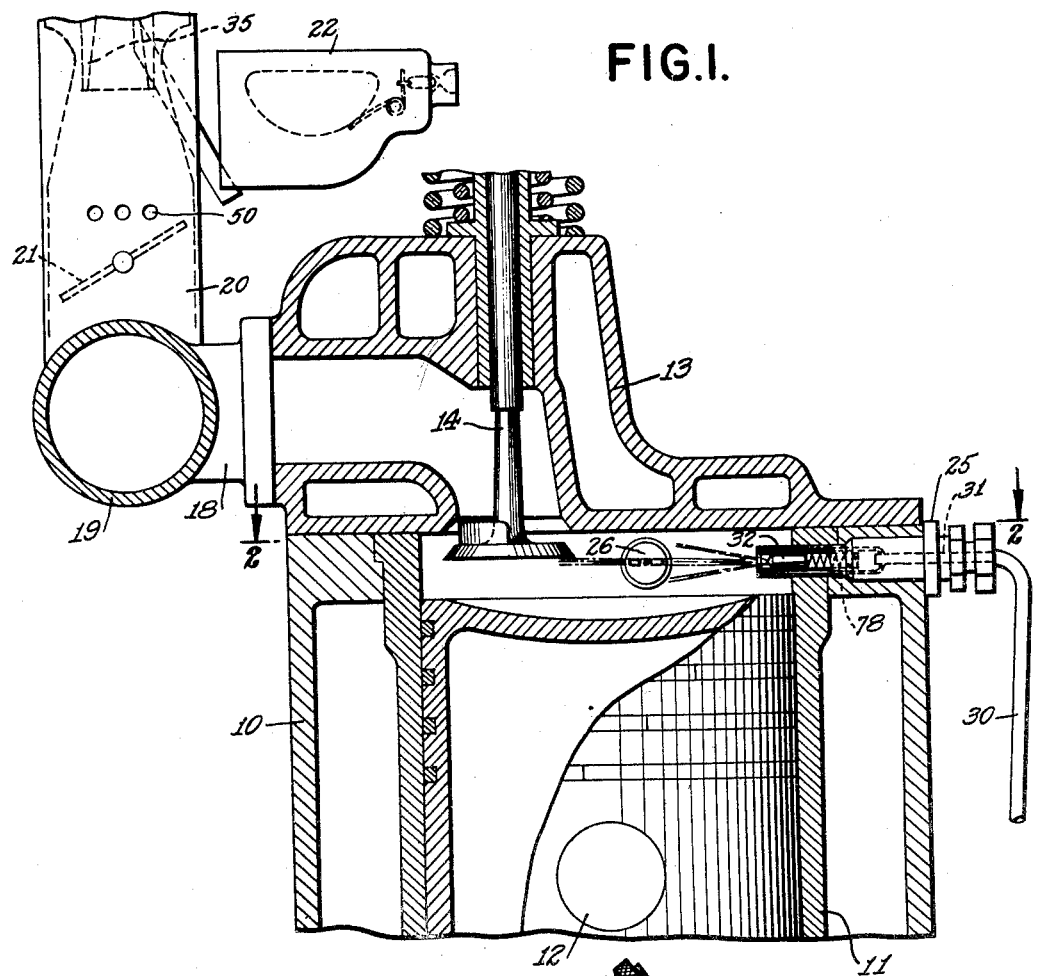
Figure 2:
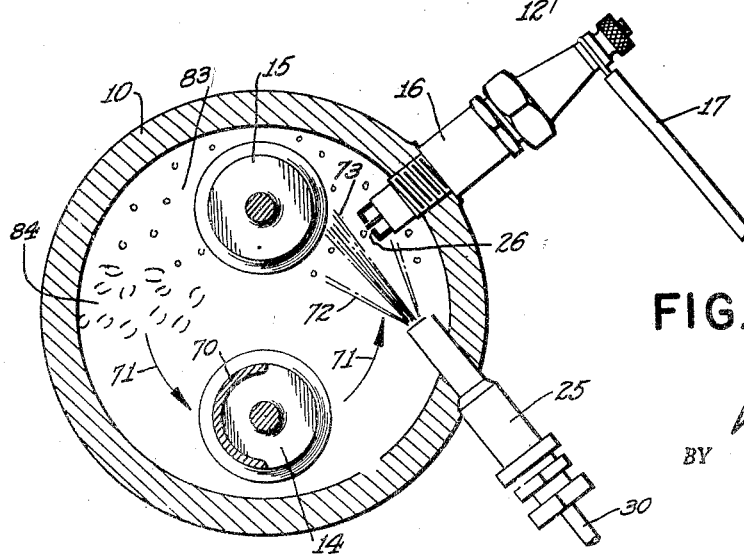
Fig. 2 is a horizontal sectional view taken on the plane on the line 2—2 of Fig. 1 looking in the direction of the arrows, illustrating the location of the valves, fuel nozzle, spark plug, and the type of combustion occurring in the combustion space.

Referring to Figures 1 and 2, the engine cylinder is indicated at 10 with piston 11 having wrist pin 12 receiving a connecting rod (not shown) which runs to the usual crank shaft (not shown). The cylinder head 13 is equipped with suitable ports controlled by an intake valve 14 and an exhaust valve 15, and an opening receiving a spark plug 16 connected by lead 17 to any conventional ignition system. Communicating with the intake valve port is a pipe 18 leading to a mixture manifold 19, having the usual induction pipe 20 with throttle valve 21 and carburetor 22. A down-draft induction pipe and carburetor are illustrated, although it is to be understood that any suitable conventional type of induction pipe and carburetor can be employed when suitably modified to incorporate the features of the present invention. The air induction pipe anterior of the carburetor may contain a customary air filter (not shown). It is to be understood that the exhaust valve port communicates with a customary exhaust pipe (not shown) which may contain a suitable muffler (not shown).

A fuel injection nozzle 25 extends through a suitable opening in the cylinder head, and is preferably directed to discharge in a generally tangential direction within the combustion space and toward the electrodes 26 of spark plug 16 and the exhaust valve 15. Fuel from a suitable source of supply is drawn through line 27 (Fig. 3) by fuel pump 28 which is actuated by shaft 29, the latter being interconnected in conventional manner with the engine crank shaft to be driven at half the engine speed. The fuel pump and control mechanism therefor, diagrammatically illustrated in Fig. 3, may be of the conventional Waukesha-Hesselman type as shown on page 61 of Diesel Engine Catalog, volume 3, published by Diesel Engines, Inc. of New York city, 1938. However, it is to be understood that any suitable conventional fuel pump and control mechanism as customarily employed for injection engines can be used.

As illustrated, fuel drawn into the pump 28 through pipe 27 is forced by the pump under a pressure of about 500–4,000 pounds per square inch through the fuel lines 30 leading to the respective injection nozzles 25 of the various engine cylinders. The fuel pump is equipped with a conventional control means for regulating the quantity of fuel injected, and the time and duration of fuel injection in relation to the engine cycle. The injection nozzle 25 has the customary fuel passage 31 containing a spring actuated nozzle plunger valve 32, which is opened by the fuel pressure as communicated from the fuel pump 28 through the fuel supply pipe 30. This particular installation thus controls the quantity of fuel supplied to the combustion space by regulation of the fuel pump plunger which is adapted to be adjusted or rotated by the sliding control rod 33. As this fuel pump and its control mechanism thus far described are conventional and well known, no further description thereof is required.

Figure 4:
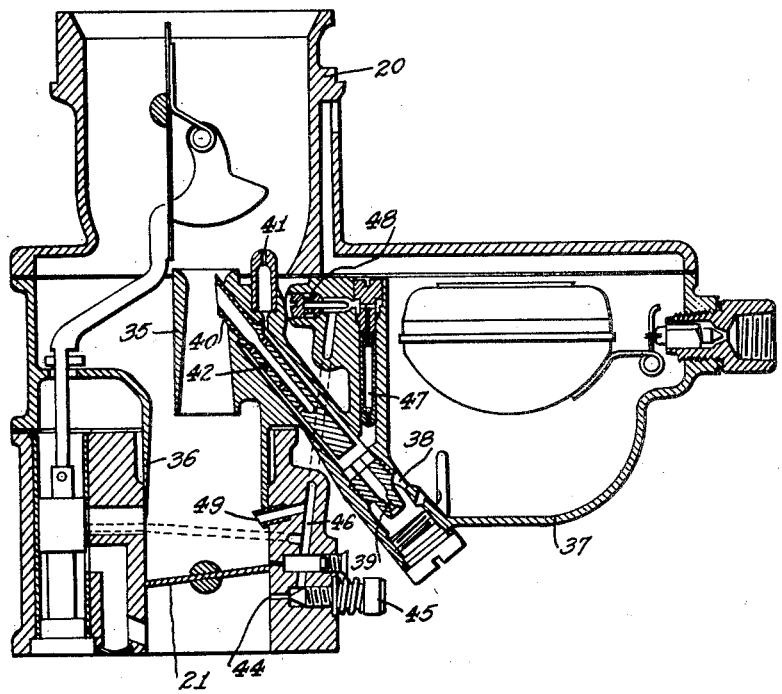
Fig. 4 is a partial enlarged sectional view of the carburetor and air intake pipe, illustrating details of the control of the carbureted mixture upon normal operation of the engine under load and upon idling.

Referring more particularly to Figure 4, the details of a suitable down-draft carburetor and idling adjustment for purposes of the present invention are illustrated. The particular device shown is a conventional Stromberg down-draft carburetor, as illustrated on page 472 of High-Speed Combustion Engines, by Heldt, published by P. M. Heldt, Nyack, New York, 1939. As shown, the air induction pipe 20, through which air enters at the top from a suitable air filter, is equipped with an inner venturi 35 and an outer venturi 36. Fuel enters from float chamber 37 through port 38 and passes through metering orifice 39 into the main nozzle 40. This nozzle is of the air-bled type, wherein bleeder air taken in at 41 enters the nozzle through a series of bleeder holes 42 distributed over its length. Nozzle 40 operates to supply fuel to carburet the air during normal operation of the engine under load when the posterior throttle 21 is open or partially open. In accordance with the present invention the metering orifice 39 is of a smaller size than ordinarily employed for Otto cycle operation, so that insufficient fuel is mixed with the air under all conditions of throttle opening to form a combustible mixture. The intake manifold thereby functions to supply during normal operation of the engine under load a carbureted fuel-air mixture which is too lean to support combustion.

During idling of the engine, when throttle 21 is closed or nearly closed, the engine vacuum effective opposite the tip of nozzle 40 is reduced, and fuel is no longer drawn therefrom. Under this condition, fuel is introduced through the idling port 44 controlled by set screw 45 and communicating by channel 46 with the idling tube 47, which latter communicates with the inner end of the nozzle 40 beyond the metering orifice 39. Air is bled into the channel 46 through the primary air bleed 48 and the secondary air bleed 49. The said air bleeds are selected with respect to port diameters to provide a sufficiently rich fuel-air mixture discharged at 44 into the manifold, whereby the mixture drawn into the combustion space is combustible and is fired by spark at the electrodes 26 during idling of the engine.

Figure 3:
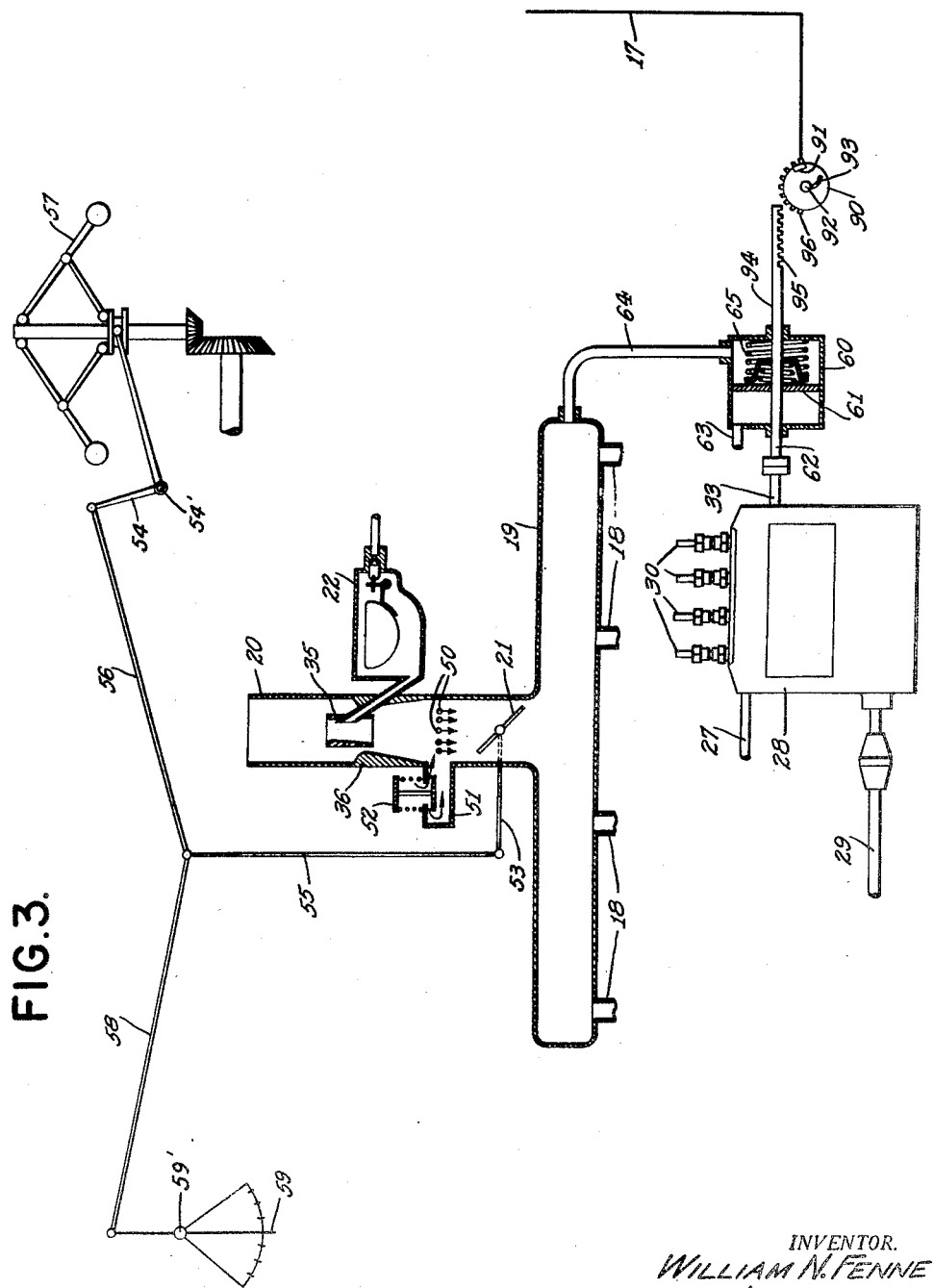
Fig. 3 is a diagrammatic view of the intake manifold, fuel pump and carbureted mixture supply means for a four-cylinder engine, illustrating the automatic controls of the present invention.

Referring again to Fig. 3, the air induction tube 20 is provided between the carburetor venturi 36 and the throttle valve 21 with a series of ports 50 communicating with a branch pipe 51 having a port opening to atmosphere and under the control of a spring loaded check valve 52. This provides for the introduction of auxiliary air into the manifold at the higher engine loads. Normally, the valve 52 remains on its seat during idling, and normal operation under load at partly opened throttle; but when the throttle is opened to about the extent shown in Fig. 3, sufficient vacuum is communicated to the check valve to draw the same from its seat against the tension of the spring. In this manner, the proper fuel-air ratio of the carbureted mixture, so as to approach but at all times be below the combustible limit, can be maintained throughout the full operating load range of the engine. As shown the throttle 21 may be actuated through suitable linkage 55 and 56 by governor 57 or by linkage 55 and 58 from a manual control 59. As illustrated in Fig. 3, the pivot shaft of throttle valve 21 is rigidly connected to a link 53 which has a swivel connection with the end of link 55. The opposite end of the latter is swivelly connected to adjacent ends of links 56 and 58, respectively. Link 56 is swivelled at its opposite end to one arm of the bell crank lever 54 pivoted at 54', the opposite end having a loose forked connection with the governor slide in conventional manner. The opposite end of link 58 is swivelled to one end of the manual control lever 59 pivoted at 59'. It will thus be seen that movement of the manual control 59, or the governor 57, will cause the link 55 to be drawn upwardly or pushed downwardly, thereby rotating link 53 about the pivot rod of throttle valve 21 and moving the throttle valve toward an open or closed position, respectively. It will be understood that, where the manual control 59 is to be used, the drive shaft for the governor 57 will be disconnected from the engine by a suitable clutch in the conventional manner.

The control of the amount of fuel injected on each cycle is automatically regulated in accordance with engine load by a vacuum cylinder 60 having a piston 61, which is interconnected by piston rod 62 with the pump control rod 33. On one side of piston 61, the cylinder 60 communicates by pipe 63 with the atmosphere, this pipe usually being connected to the air induction pipe 20 between the air filter and the carburetor to prevent dust and dirt from entering the cylinder 60. On the other side of the piston 61, the cylinder communicates by pipe 64 with the mixture manifold 19, so that the piston 61 is under the influence of the manifold vacuum. Movement of piston 61 toward the right under the influence of the manifold vacuum is resisted by a spring 65.

When the throttle is partially open as indicated in Fig. 3, piston 61 assumes an intermediate position as shown in this figure. Further opening movement of the throttle lowers the vacuum existing in the intake manifold 19 and thereby communicated by pipe 64 to the cylinder 60, and the spring 65 then moves piston 61 and pump control rod 33 to the left, which increases the amount of fuel injected into the combustion space on each cycle. When load on the engine is reduced and throttle 21 is moved toward closing position, the vacuum in the mixture manifold 19 increases and piston 61 moves control rod 33 to the right, thereby decreasing the amount of fuel injected on each cycle. At the same time the auxiliary air valve 52 closes with the result that an increased proportion of the total fuel is introduced by carbureted mixture and a decreased proportion of the total fuel is introduced by fuel injection on each cycle at the lower loads.

The construction is such that at the lower load range below that causing opening of the auxiliary air valve 52, the total quantity of air for combustion on each cycle is drawn in through the air induction pipe 20 past the carburetor jet 40 and is carbureted with fuel in accordance with the rate of flow of air through the venturis 35 and 36 to maintain a rather constant fuel-air ratio somewhat below the combustible limit. Inasmuch as this air is throttled by valve 21, the total quantity of air drawn into the combustion space on each cycle during this lower load range is reduced, and the smaller quantity of fuel injected from nozzle 25, as controlled by vacuum cylinder 60, is sufficient to raise most of the compressed lean fuel-air mixture in the combustion space to within the combustible limit, whereby substantially complete combustion of the total fuel added on each cycle is secured. As the load further increases and throttle 21 opens beyond the position shown in Fig. 3, increase of the manifold vacuum effective opposite the nozzle 40 tends to unduly richen the air passing through venturis 35 and 36, and at this time valve 52 opens to supply sufficient auxiliary air to maintain the overall fuel-air ratio of the mixture drawn into the combustion space below the combustible limit. As the total quantity of air drawn into the cylinder at this time is increased, the larger quantity of fuel injected from nozzle 25 maintains the desired final overall fuel-air ratio, whereby efficient combusition of the total fuel is secured to supply the greater power demanded.

At the highest loads approaching fully open throttle, sufficient auxiliary air is drawn in to somewhat reduce the fuel-air ratio of the lean carbureted mixture below that formed throughout the normal running or cruising load range, while the quantity of injected fuel is further increased in proportion. Since this condition is normally caused by a sudden application of load or upon acceleration which is temporary, and is usually accompanied by lower speeds, the problem of fuel distribution is not acute, and more efficient combustion and greater power are secured than is possible with a similar size engine operating on carbureted mixture alone on the conventional Otto cycle. While in the above discussion, the air induction pipe 20 and the auxiliary air intake 51 have been described as opening to atmosphere, it is to be understood that they can be connected in conventional manner to the discharge side of a supercharger with conventional changes for supercharged operation as are well understood, whereby the engine can be operated at any desired boost pressure for further increase in power.

When the throttle valve is moved to closed or idling position, the vacuum in the mixture manifold is at a maximum, and piston 61 is moved to the extreme right position where it entirely cuts off the supply of fuel from fuel pump 28 through the fuel lines 30 to the injection nozzles. At this time the idling fuel port 44 comes into play and supplies a combustible fuel mixture to the combustion space of each cylinder which is fired by spark at electrodes 26 with conventional Otto cycle operation.

Referring again to Figs. 1 and 2, intake valve 14 is provided with a shroud 70, which opens in a generally tangential direction within the combustion space. Consequently, on the suction stroke of piston 11, the incoming lean incombustible carbureted fuel-air mixture is introduced into the combustion space in a generally tangential direction so as to impart a high rotational velocity thereto in the direction of the arrows 71. This air swirl persists during the compression stroke and during the period of fuel injection. The fuel injection nozzle 25 is also directed to discharge tangentially of the combustion space and generally toward the electrodes 26 of adjacently positioned spark plug 16 and toward the exhaust valve 15.

Figure 5:
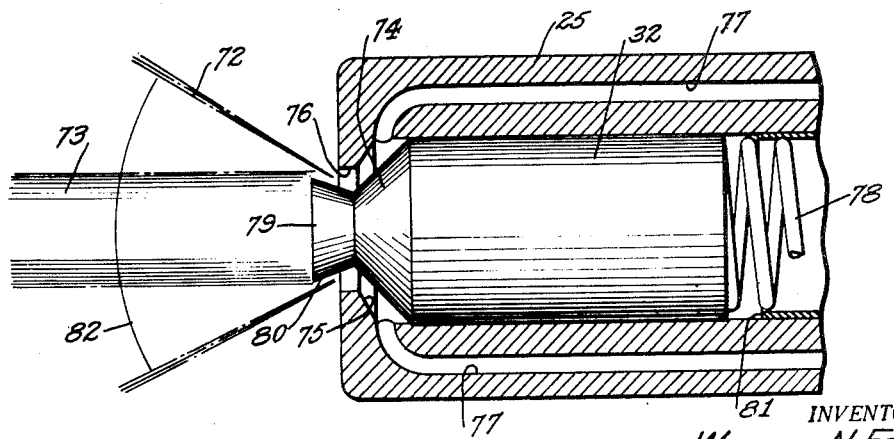
Fig. 5 is a partial enlarged sectional view of the fuel injection nozzle.

The injection nozzle 25 has a pintle tip constructed as shown in Fig. 5 adapted to inject the fuel in the form of a cone-shaped jet 72 at the start of injection, and then to continue the injection with both the cone-shaped jet of lower intensity and a central jet 73 of higher intensity during the balance of the injection period. As shown, the spring actuated nozzle plunger valve 32 has an inclined surface 74, the forward portion of which is adapted to contact the valve seat 75 carried by the pintle tip just rearwardly of the injection port 76 when the cooperating fuel pump plunger of pump 28 is not forcing fuel through pipe 30 under high injection pressure. Pipe 30 communicates with an annular fuel channel 77 formed in the pintle tip, and which opens about a substantial portion of the inclined surface 74 just rearwardly of valve seat 75. When the fuel pump plunger forces fuel under high injection pressure through pipe 30 and channel 77, the pressure of the fuel acting rearwardly on inclined surface 74 forces the nozzle plunger valve 32 off its seat 75 against the action of spring 78. Valve 32 carries a pintle 79 protruding through port 76 and formed with an inclined deflecting surface 80.

When valve 32 has just barely moved off of its seat 75, a small annular inclined channel is formed between inclined surface 74 and seat 75 through which fuel passes at high pressure, the inclination of the channel being such that the fuel impinges upon inclined surface 80 of pintle 79 and is deflected and atomized into the combustion space in the form of the hollow cone jet 72. The impingement of substantially all of the fuel on surface 80 breaks the force of the jet, so that the cone jet is of relatively lower intensity and penetrates into the combustion space only for such a distance as to bring the outer end of the jet immediately adjacent to the electrodes 26 of spark plug 16.

As valve 32 is forced farther off its seat upon continued opening movement, pintle 79 is drawn to the right (Fig. 5) within port 76 until finally the inclined surface 80 is almost wholly within the confines of the nozzle. At the same time the channel between surfaces 74 and 75 increases in cross-section, so that there is progressively less directional influence on the fuel toward the deflecting surface 80 and a portion of the fuel is free to pass directly through port 76 without impingement upon surface 80. This forms the central jet 73 of higher intensity, which penetrates across a chord of the combustion space in a somewhat upwardly inclined direction and impinges on the bottom face of exhaust valve 15, which is then closed. More of the fuel passes to the central jet and less is deflected from the inclined surface 80 in the form of the cone shaped jet, as the opening movement of the valve progresses. But, preferably, at the limit of opening movement of the valve as determined by a suitable stop 81, a portion of the fuel still is deflected off of the surface 80, so that fuel injection is continued with both the cone-shaped jet and the central jet. Obviously, the force of the surrounding central jet at this time will interfere with the free path of the fuel deflected off of the inner surface 80, so that the included angle 82 of the cone jet will decrease and its intensity also decrease, with the result that the cone jet moves away from electrodes 26 and the cylinder wall following ignition and the start of combustion, and the dangers of fouling the electrodes and causing fuel deposits on the cylinder wall are minimized.

The beginning of fuel injection ordinarily occurs at about 60° to 30° before top dead center of the compression stroke. Simultaneously with the beginning of injection, or with not more than about 5° of crank angle lag following the start of injection, a spark at electrodes 26 ignites the combustible envelopes of fuel-air mixture surrounding the fuel particles 82' from the cone shaped jet. This establishes a flame front of burning particles which are swept by the lean mixture swirl in the direction of the exhaust valve 15. Since the carbureted fuel-air mixture within the combustion space beyond these first entering fuel particles is too lean to support combustion, the flame front tends to progress toward the spark plug and injection nozzle, its normal progress being impeded by the counteracting swirl and by the fact that injected fuel close to the nozzle tip has not had time to form a combustible mixture.

Following the initiation of combustion, the central fuel jet of higher intensity comes into play, this jet impinging upon the highly heated surface of the exhaust valve 15. This produces further atomization of the fuel particles in the immediate locality of the flame of the burning envelopes of the previously ignited particles, which have now traveled to the region as indicated by 83. The additional fuel particles are thereby confined to the localized zone of active combustion and are brought into contact with the previously ignited flaming particles in such a manner as to secure substantially complete and rapid combustion thereof. The swirling movement within the combustion space carries fresh lean mixture to the zone of combustion, and the travel of the flame front counter to this swirl maintains the localized zone of combustion generally within the region adjacent the exhaust valve. The atomized fuel particles are apparently completely vaporized and burned by the time the swirling mass reaches the region indicated by 84, so that the active zone of combustion is at all times cushioned and confined by incombustible lean mixture or such lean mixture on one side and products of combustion on the other. Thus, accumulation of combustible end gases trapped by the flame front is avoided, and knocking cannot occur. Following the power stroke, the exhaust valve 15 opens to discharge products of combustion on the exhaust stroke of the piston, and the cycle is then repeated as above described.

The ignition advance is correlated with the injection advance during operation of the engine with fuel injection, so that ignition occurs at or shortly after the beginning of fuel injection. For example, the ignition advance may be set to cause sparking at the electrodes 26 at about 40-45° before top dead center when employing injection advance of about 45°. However, idling of the engine on carbureted mixture alone is more efficiently obtained with a spark setting of about 10-20° before top dead center. Fig. 3 illustrates a construction for automatically retarding the spark for idling, and for automatically advancing the spark for normal operation under load when fuel injection is again resumed.

As shown, the usual spark distributor cap is indicated at 90 which carries the fixed contact 91 connected by wire 17 to spark plug 16. The distributor shaft 92, which is interconnected to be driven from the engine in conventional manner at half the engine speed, carries the usual contact arm 93. Piston rod 62 is provided with an extension 94 on the right hand side of piston 61 which slides through a suitable stuffing box in the end wall of vacuum cylinder 60. Rod 94 is formed with a rack 95, the teeth of which are adapted to engage the cooperating teeth of an annular pinion gear 96 carried by the distributor cap 90. During normal operation of the engine under load, piston 61 has moved rack 95 out of engagement with pinion gear 96. However, upon movement of throttle 21 to closed or idling position, travel of piston 61 to the extreme right brings rack 95 into engagement with pinion gear 96, thereby rotating distributor cap 90 and contact 91 to retard the spark. Upon resumption of normal running under load, movement of piston 61 and rack 95 to the left rotates the distributor cap 90 and contact 91 back to its original position of desired spark advance for the fuel injection operation.

While certain figures for injection advance and spark advance are given above, it is to be understood that these were mentioned by way of example and not by way of limitation. In actual practice, the start of fuel injection may be as much as 75° before top dead center; it may be, for example, about 40° for maximum power. It will be further understood that the above figures for injection advance and spark advance apply for a particular set of conditions of engine size and speed, for example, about 1800 R. P. M. for a 3¼ inch bore engine, and the settings will be different for maximum power in the case of other engine sizes and speeds. The beginning of fuel injection may be at, or even slightly after, top dead center; and, of course, satisfactory operation may be secured at settings within the limits mentioned.

While the invention has been described above as applied to four-cycle operation, it is to be understood that the invention is also applicable to two-cycle operation; in fact, the invention lends itself particularly well to two-cycle operation since an exact control of the lean carbureted fuel-air mixture ratio is not required and the main control of the combustion and pressure rise is by proper design and regulation of the fuel injection. For example, a two-cycle engine may be equipped with intake ports communicating with an induction pipe provided with a carburetor and auxiliary air valve as described above, the intake ports being formed in the cylinder for directional introduction of the lean carbureted fuel-air mixture just above the bottom of piston travel for each end of the cylinder, whereby a swirling movement of the lean mixture can be imparted. Poppet exhaust valves may be provided at opposite ends of the cylinder for discharge of the exhaust gases. However, it is to be understood that any conventional construction or design of two-cycle engine can be readily converted to this method of operation.

Since the present invention effectively eliminates both ignition lag and knock, the engine can be designed to operate at compression ratios of about 4:1 up to 16:1 and higher, although in the practical sense about 10:1 is generally preferred. Also, it can be designed to operate from an absolute manifold pressure of below 20 inches of mercury, that is, 10 inches below atmospheric pressure, up to boost pressures of 140 inches of mercury absolute or higher. In fact, the only apparent limitations to further increasing the compression ratio involve considerations of piston and cylinder head clearances and valve operation; and the only apparent limitations to further increasing the manifold pressure involve considerations of supercharger pressure obtainable and the power available to run the supercharger. The rate of fuel injection can be controlled so that the engine operates on a cycle approaching the theoretical Otto pressure-indicator diagram with combustion at constant volume, or approaching the theoretical Diesel diagram with combustion at constant pressure, or on an intermediate cycle.

The present invention enables a wide range of fuels to be employed. While fuels within the gasoline boiling range are generally preferred, it is to be understood that higher boiling fuels of the character of kerosine, gas oil, fuel oil, and even light lubricating oil may be used. Since both ignition lag and knocking are eliminated, the cetane value and octane value of the fuel are not important, and any readily available fuel of the character described above can be employed. Likewise, normally gaseous fuels of the character of butane can also be used, preferably utilizing sufficient pump pressure to maintain the fuel liquefied in the lines leading to the injection nozzle. Moreover, if desired, different fuels may be used for carburetion and for injection, such as gasoline for the carburetor and gas oil for the fuel injection system. Where heavier fuels of the character of light lubricating oil are employed, such fuels are preferably preheated prior to injection. Satisfactory operation is secured with the lighter fuels without preheating. Starting of the engine is also facilitated, since firing of the charge does not depend upon the formation of a combustible fuel-air mixture by carburetion, but fuel injection with lighter fuels insures the formation of a localized combustible mixture adjacent the spark which is fired without difficulty. Moreover, when a heavy fuel is supplied for fuel injection, then starting may be facilitated by the use of a light fuel for carburetion (such as a gasoline), employing the conventional carburetor choke to supply a combustible fuel-air mixture through the intake manifold which is fired in conventional manner.

While the invention has been described above as employing conventional ignition systems and spark plugs, utilizing the principle of instantaneous spark at a fixed point in the cycle, it is to be understood that multiple spark or continuous spark can be used, since desirable operation of the present engine involves the immediate ignition of the combustible fuel-air mixture as soon as it is formed. While the continuous spark can be left on during the entire engine cycle, it is obvious that this arrangement can be easily synchronized with engine operation so that the spark is on only for a selected period of the compression or combustion strokes or both, and can be turned off during the balance of the cycle. Whenever the expressions "spark ignition" and "ignited by spark" or similar expressions appear in the description and claims, it is to be understood that these include any of the errangements described above for igniting the localized combustible fuel-air mixture.

The fuel-air weight ratio of the carbureted mixture is generally controlled in accordance with the present invention to approach about 0.02 or less. The fuel injection then raises the overall fuel-air ratio to within the combustible limit and preferably about 0.06 to 0.10. For normal running or cruising, this overall ratio is generally about 0.06–0.07, giving high fuel economy; and for maximum loads and power it is generally about 0.08–0.10. The idling adjustment of the carburetor is generally set for a ratio of about 0.09–0.11. However, these figures are merely given by way of example and are not limiting, since satisfactory operation can be secured within any portion of the combustible limit range.

While a preferred embodiment of the invention has been described above, wherein the fuel-air mixture ratio supplied by carburetion may be maintained rather constant and below the combustible limit throughout the normal load range, it is to be understood that variations thereof are included within the scope of the invention. Thus, the metering orifices and jets, and the auxiliary air valve, may be so selected and correlated that the carbureted fuel-air mixture becomes leaner at higher loads, or vice versa. Moreover, it is feasible to operate with carbureted mixture plus fuel injection throughout the lower load range, and automatically shut off the carburetor fuel jet (as by a suitable interconnection between the throttle control and a fuel jet pintle or metering rod) at the higher loads approaching fully opened throttle, so that the engine then operates on fuel injection alone.

Obviously many modifications and variations of the invention, as hereinbefore set forth, may be made without departing from the spirit and scope thereof, and therefore only such limitations should be imposed as are indicated in the appended claims.

I claim:

1. In the operation of an internal combustion engine without knocking, wherein a carbureted mixture of air and fuel which is too lean to support combustion is introduced directly into the main combustion space of a cylinder of said engine and compressed therein, fuel is injected in atomized form into a localized portion of said compressed lean mixture in said main combustion space to render the said localized portion combustible, the said localized portion is promptly spark-ignited to establish a traveling flame front, and the injection of fuel is continued following the establishment of said traveling flame front while moving the locus of fuel injection and the compressed lean mixture in said main combustion space relatively to each other in an orderly manner to successively impregnate additional portions of the compressed lean mixture with fuel to progressively form additional localized combustible mixtures immediately in advance of the traveling flame front so that they are ignited thereby and burned substantially as rapidly as formed, the improvement which comprises carbureting at least the major portion of the air introduced into said main combustion space while maintaining the resulting carbureted mixture introduced therein below the combustible limit during normal operation of the engine under load, adding auxiliary uncarbureted air to the carbureted fuel-air mixture introduced into the said main combustion space at higher engine loads, and concomitantly increasing the amount of fuel injected in atomized form to thereby decrease the proportion of the total fuel added by carbureted mixture and increase the proportion of the total fuel added by injection at the higher engine loads.

2. An internal combustion engine having a cylinder and a piston therein providing a main combustion space, means for introducing a carbureted fuel-air mixture directly into said main combustion space to be compressed therein on the compression stroke of said piston, means for injecting atomized fuel directly into said compressed carbureted fuel-air mixture within said main combustion space toward the end of said compression stroke, spark ignition means for initiating combustion of the charge within said combustion space, means for controlling the fuel-air ratio of said carbureted fuel-air mixture during normal operation of said engine under load so that the resulting carbureted mixture is too lean to support combustion, control means for regulating the injection of atomized fuel during the normal operation of said engine under load to richen the compressed lean mixture to render the same combustible, and means operatively interconnected with said control means for terminating the injection of atomized fuel and concomitantly richening the carbureted fuel-air mixture to render the same spark-ignitible during idling of said engine.

3. In an internal combustion engine having a cylinder provided with a piston and forming a combustion space, an intake valve for said combustion space, an exhaust valve for said combustion space, a fuel injection nozzle opening into said combustion space, a spark plug having electrodes positioned within said combustion space generally intermediate said nozzle and said exhaust valve, and means associated with said nozzle for producing a lower intensity fuel jet which passes to the immediate vicinity of said plug electrodes and a higher intensity jet which misses said plug electrodes and impinges on said exhaust valve and is deflected thereby into said combustion space beyond said plug electrodes.

4. In an internal combustion engine having a cylinder provided with a piston and forming a combustion space, means for introducing air unmixed with sufficient fuel to support combustion into the said combustion space in a manner to produce a swirling motion of the air therein, an exhaust valve carried by said cylinder, a fuel injection nozzle carried by said cylinder on the upstream side of the exhaust valve and with the axis of the nozzle directed generally along a chord of the combustion space and in the direction of the exhaust valve, a spark plug mounted on said cylinder and having electrodes positioned within said combustion space generally between said nozzle and exhaust valve in the direction of air swirl but to one side of the said nozzle axis, means associated with said nozzle to start fuel injection toward the latter part of the compression stroke with a flaring cone-shaped jet of lower intensity which passes to the immediate vicinity of the plug electrodes, and to then continue injection with a central jet of higher intensity which impinges on said exhaust valve and is deflected thereby into the combustion space beyond said plug electrodes in the direction of air swirl, and electrical means associated with said plug and synchronized with engine operation for producing a spark at said plug electrodes at the time in the cycle when the first entering portion of the fuel of said cone-shaped jet reaches the vicinity of said electrodes.

5. In the operation of an internal combustion engine without knocking, wherein a carbureted mixture of air and fuel which is too lean to support combustion is introduced directly into the main combustion space of a cylinder of said engine and compressed therein, fuel is injected in atomized form directly into a localized portion of said compressed lean mixture in said main combustion space to render the said localized portion combustible, the said localized portion is promptly spark-ignited to establish a traveling flame front, and the injection of fuel is continued following the establishment of said traveling flame front while moving the locus of fuel injection and the compressed lean mixture in said main combustion space relatively to each other in an orderly manner to successively impregnate additional portions of the compressed lean mixture with fuel to progressively form additional localized combustible mixtures immediately in advance of the traveling flame front so that they are ignited thereby and burned substantially as rapidly as formed, the improvement which comprises carbureting at least the major portion of the air introduced into said main combustion space while maintaining the resulting carbureted mixture introduced therein below the combustible limit during normal operation of the engine under load, and substantially richening the carbureted mixture introduced into the said combustion space to render the same spark-ignitible while highly throttling the same and concomitantly terminating fuel injection during idling of the engine.

6. In the operation without knocking of an internal combustion engine having a cylinder with a main combustion space and having an exhaust passage controlled by an exhaust valve forming a portion of the confining wall of said combustion space, wherein air unmixed with sufficient fuel to support combustion is introduced into the said main combustion space and compressed therein, fuel is injected into a localized portion of said compressed air within said main combustion space, the first entering portion of said fuel is promptly spark-ignited intermediate said locus of fuel injection and said exhaust valve substantially as soon as combustible fuel vapor-air mixture is formed therefrom to establish a traveling flame front, and the injection of fuel is continued in advance of the traveling flame front while remaining compressed air is moved past the locus of injection in said combustion space in an orderly manner to progressively form additional quantities of combustible mixture immediately in advance of the traveling flame front which are ignited thereby and burned substantially as rapidly as formed, the improvement which comprises initiating fuel injection on a cycle by a hollow cone jet of substantial divergence and lower penetration which is spark-ignited adjacent an outer edge thereof, and then continuing injection on said cycle by a central jet lying within the bounding region of the diverging hollow cone jet so as to be substantially spaced from the point of spark ignition and having sufficiently greater penetration so as to impact against said exhaust valve and be deflected therefrom beyond said locus of spark ignition.

7. In an internal combustion engine having a cylinder and a piston therein providing a combustion space, an air intake for said cylinder for the introduction of air into said combustion space for compression therein by said piston, a fuel injection nozzle for introducing atomized fuel into the compressed air within said combustion space, a spark plug having electrodes positioned within said combustion space to ignite the first increment of injected fuel as soon as combustible fuel vapor-air mixture is formed therefrom to establish a traveling flame front, and means for moving the compressed air and locus of fuel injection relatively to each other in an orderly manner within said combustion space during the balance of the period of fuel injection to progressively form additional quantities of combustible mixture immediately in advance of the traveling flame front to be ignited thereby and burned substantially as rapidly as formed, the improvement comprising a carbureter associated with said air intake, a throttle for said air intake regulating the carburetion of the air passing through said air intake to form a carbureted mixture in said combustion space which is at all times too lean to support combustion during normal operation of the engine under load, means for controlling the quantity of fuel injected on each cycle through said fuel injection nozzle, an operative interconnection between said throttle and said fuel injection control for automatically moving said throttle toward closed position as the fuel injection control is moved to decrease the amount of fuel injected for decreasing load, and vice versa for increasing load, and means associated with said carbureter and brought into play when said interconnection has moved said fuel injection control to terminate fuel injection and concomitantly moved said throttle to idling position effective to substantially richen the carbureted mixture supplied to the combustion space during idling of the engine to render said mixture spark-ignitible.

8. The method in the operation of a spark ignition internal combustion engine having a cylinder providing a main combustion space which comprises carrying out the combustion both by the introduction directly into the main combustion space of carbureted fuel-air mixture which is too lean to support combustion on the suction stroke and by the injection of additional fuel in atomized form directly into the lean carbureted mixture within said main combustion space during the latter part of the compression stroke and with prompt spark ignition thereof during operation of the engine under load, and terminating the injection of atomized fuel while richening the carbureted fuel-air mixture to render the latter spark-ignitible with concomitant retarding of the spark ignition for idling of the engine.

WILLIAM N. FENNEY.

REFERENCES CITED

The following references are of record in the file of this patent:

UNITED STATES PATENTS

| Number | Name | Date |
|---|---|---|
| 801,390 | Low | Oct. 10, 1905 |
| 1,167,376 | Bouteille | Jan. 11, 1916 |
| 1,273,834 | Dumanois | July 30, 1918 |
| 1,305,579 | Wolfard | June 3, 1919 |
| 1,676,828 | Howard et al. | July 10, 1928 |
| 1,858,824 | Heidelberg | May 17, 1932 |
| 1,969,682 | Arthur | Aug. 7, 1934 |
| 2,058,487 | Mock | Oct. 27, 1936 |
| 2,109,103 | Cole | Feb. 22, 1938 |
| 2,125,293 | Hesselman | Aug. 2, 1938 |
| 2,142,280 | Mock | Jan. 3, 1939 |
| 2,165,176 | Fodor | July 4, 1939 |
| 2,199,706 | Mallory | May 7, 1940 |
| 2,269,104 | Hedlund | Jan. 6, 1942 |

OTHER REFERENCES

Ser. No. 237,472, Scherenberg (A. P. C.), pub. May 11, 1943.